United States Patent [19]

Okita et al.

[11] Patent Number: 4,664,965

[45] Date of Patent: May 12, 1987

[54] MAGNETIC RECORDING MEDIUM

[75] Inventors: Tsutomu Okita; Hiroshi Hashimoto; Yoshito Mukaida, all of Kanagawa, Japan

[73] Assignee: Fuji Photo Film Co., Ltd., Kanagawa, Japan

[21] Appl. No.: 684,319

[22] Filed: Dec. 20, 1984

[30] Foreign Application Priority Data

Dec. 22, 1983 [JP] Japan ................................. 58-241051
Jan. 25, 1984 [JP] Japan ..................................... 59-9969

[51] Int. Cl.$^4$ .............................................. G11B 7/702
[52] U.S. Cl. ........................................ 428/143; 427/44; 427/128; 427/131; 428/148; 428/212; 428/336; 428/425.9; 428/522; 428/694; 428/900
[58] Field of Search .......................... 427/44, 128, 131; 428/694, 695, 425.9, 522, 143, 148, 212, 216, 336; 360/134–136; 252/62.54

[56] References Cited

U.S. PATENT DOCUMENTS

| 4,468,436 | 8/1984 | Okita | 428/425.9 |
| 4,496,626 | 1/1985 | Kasugu | 428/336 |
| 4,511,629 | 4/1985 | Konno | 428/522 |

Primary Examiner—Ellis P. Robinson
Attorney, Agent, or Firm—Sughrue, Mion, Zinn, Macpeak, and Seas

[57] ABSTRACT

A magnetic recording medium is disclosed, which comprises a non-magnetic support having a surface roughness of not less than 0.01 μm having thereon an intermediate layer and a magnetic layer, the intermediate layer comprising a polyester polyol having at least two acryloyl and/or methacryloyl groups in the molecule thereof, which has been polymerization-hardened by exposure to radiation. The magnetic recording medium has markedly improved video sensitivity, C/N ratio and adhesiveness between the support and the magnetic layer.

16 Claims, No Drawings

MAGNETIC RECORDING MEDIUM

FIELD OF THE INVENTION

The present invention related to a magnetic recording medium, more particularly, to a magnetic recording medium suitable for high density recording.

BACKGROUND OF THE INVENTION

It has been desired in magnetic recording media for high density recording that the surface properties of the magnetic layer be highly improved to reduce spacing loss between the medium and a magnetic head. For this purpose, not only must the surface properties of the magnetic layer be improved by improving the manufacturing techniques of the magnetic layer, but also the surface properties of the support have to be improved. It has been tried to make the thickness of the magnetic layer thinner in order to reduce thickness loss because the recording wave length is less with increased recording density and, as a result, the surface properties of the magnetic layer are more affected by the surface properties of the support.

However, there are limitations, due to the following reasons, on improving the surface properties of the support used for a magnetic recording medium. That is, as the surface properties of the film used as a support for the magnetic layer become better, frictional resistance to travelling rolls increase, and, as a result, in winding a cast film, it meanders or is wrinkled. Further, the film or web cannot be uniformly wound, because frictional resistance between opposite surfaces of the wound film increase.

Various solutions have been proposed to overcome these inconsistent factors. For example, it is disclosed in Japanese Patent Application (OPI) No. 109,605/78 that a magnetic layer be coated on a support on which stilted fine particle of a thermoplastic resin have been provided and removed by dissolution with a solvent. However, according to this method, the characteristics necessary for a magnetic recording medium for high density recording cannot be attained.

SUMMARY OF THE INVENTION

An object of the invention is to provide a magnetic recording medium suitable for high density recording not accompanied by conventional defects as described above.

Another object of the invention is to provide a magnetic recording medium having a better S/N ratio or C/N ratio.

A still another object of the invention is to provide a magnetic recording medium having an intermediate layer strongly adhesive to a non-magnetic support.

A further object of the invention is to provide a magnetic recording medium having an intermediate layer of better coating properties.

A still further object of the invention is to provide a magnetic recording medium having better durability.

After extensive research, the inventors found that the above objects of the invention can be attained by providing an intermediate layer, between a non-magnetic support having a surface roughness (Ra) not less than 0.01 μm (cut-off 5 value: 0.25 mm) and a magnetic layer, containing a polyester polyol (hereinafter called a polyester acrylate) having at least two acryloyl groups and/or methacryloyl groups in its molecule which is polymerized and hardened by radiation.

Thus, the present invention relates to a magnetic recording medium having an intermediate layer containing a polyester acrylate (which is exposed to radiation) between a non-magnetic support having a surface roughness not less than 0.01 μm and a magnetic layer.

DESCRIPTION OF PREFERRED EMBODIMENTS

Illustrative non-magnetic supports used in this invention include polyesters (e.g. polyethylene terephthalate or polyethylene-2,6-naphthalate), polyolefins (e.g. polyethylene or polypropylene), cellulose derivatives (e.g. cellulose triacetate, cellulose diacetate, cellulose acetate butylate or cellulose acetate propionate), vinyl resins (e.g. polyvinyl chloride or polyvinylidene chloride), other plastics (e.g. polycarbonate, polyimide or polyimidoamide), non-magnetic metals (e.g. aluminum, copper, tin, zinc, a non-magnetic alloy containing these metals or stainless steel), paper, baryta paper or paper coated or laminated with a polymer of α-olefin having 2 to 10 carbon atoms (e.g. polyethylene, polypropylene or ethylene-butene copolymers), etc.

The surface roughness in this invention means center line average roughness as defined in JIS-B 0601, paragraph 5, and the cut-off value is 0.25 mm.

The surface roughness of the support used in this invention is not less than 0.01 μm, preferably 0.015 to 0.5 μm.

It is possible to use a non-magnetic support having opposite surfaces of different surface roughness, but one needs more complicated techniques to prepare such a support and preparation efficiency is low. In the invention, a non-magnetic support having opposite surfaces of substantially the same surface roughness is preferably used, but the supports used in this invention are not limited to such supports.

On the back surface of the support used in this invention, a back coating layer can be provided to improve running properties. In this case, the surface roughness of the back coating layer is not less than 0.01 μm, and preferably not less than 0.015 μm to achieve the effects of the invention.

The polyester acrylate used in this invention is a polyester polyol including a polyester polyether polyol) having at least two hydroxyl groups which are modified with an acrylate or methacrylate group. Examples of the polyester polyols are those formed from a polyhydric alcohol and a polybasic acid, or those formed by polymerization of a lactone ring compound or by self-condensation of a hydroxy group-containing carboxylic acid wherein the terminal carboxyl group of the resulting polyesters is converted into a hydroxyl group. These starting materials, i.e., polyhydric alcohols, polybasic acids, lactone ring compounds, and hydroxy group-containing carboxylic acids, preferably have 2 to 10 carbon atoms and a molecular weight of 50 to 300. As examples of polyhydric alcohols, there are ethylene glycol, propylene glycol, pentanediol, neopentyl glycol, butanediol, hexanediol, octanediol, cyclohexane-1,4-diol, cyclohexane-1,4-dimethanol, diethylene glycol, triethylene glycol, glycerol, trimethylol propane, pentaerythritol, dipentaerythritol or mixture thereof. As examples of polybasic acids, there are fumaric acid, maleic acid, succinic acid, adipic acid, sebacic acid, phthalic acid, isophthalic acid, terephthalic acid, cyclohexane-1,4-dicarboxylic acid, etc. As examples of lactone ring compounds and hydroxy group-containing carboxylic acids, there are γ-bytyrolactone, β-propiolactone, γ-valerolactone, δ-valerolactone, ε-caprolactone ε-hexalactone, β-hydroxypropionic acid, γ-hydroxybutyric acid, δ-hydroxyvaleric acid or 4-hydroxybenzoic acid. The polyester acrylate used in the present invention has two or more, preferably upto six, acryloyl groups and/or methacryloyl groups in its molecule. The number average molecular weight of polyester acrylates is preferably not less than 300, more preferably 500 to 5000.

According to this invention, the polyester acrylate is provided on the support and is polymerized and hardened by radiation to obtain an intermediate layer having good adhesive properties to the support and good surface properties (e.g. less than 0.01 μm in surface roughness), even if a support having a surface roughness not less than 0.01 μm, which is easily handled in manufacturing, is employed. Therefore, the surface properties of the magnetic layer provided on the intermediate layer are markedly improved. Further, according to this invention, since the intermediate layer improves the coating properties of the magnetic layer as well as improves surface properties, durability and electromagnetic properties are improved to obtain magnetic recording media suitable for high density recording.

An intermediate layer having better surface properties and better adhesion to the support can be formed using other monomers (hereafter called "monomer") polymerizable by exposure to radiation with the polyester acrylate because a coating composition containing the polyester acrylate and the monomer has low viscosity, good coating properties and a good self-levelling properties and provides a thin coating layer.

The monomer polymerizable by radiation exposure and employed in the intermediate layer is a compound having at least one (and preferably up to six) carbon-carbon unsaturated bonds in the molecule. The monomer has generally 30 or less carbon atoms, preferably not more than 24 carbon atoms, and has a moleculer weight of less than 500, preferably less than 300. Typical examples of such monomers are acrylates, acrylamides, methacrylates, methacrylamides, allyl compounds, vinyl ethers, vinyl esters, vinyl heterocyclic compounds, N-vinyl compounds, styrenes, acrylic acid, methacrylic acid, crotonic acids, itaconic acids, olefins and hydrofuril acrylate. More preferred compounds have two or more acryloyl groups and/or methacryloyl groups, and include acrylates such as diethylene glycol diacrylate, triethylene glycol diacrylate,tetraethylene glycol diacrylate, trimethylol propane triacrylate, or pentaerythritol tetraacrylate; methacrylates such as diethylene glycol dimethacrylate, triethylene glycol trimethacrylate, tetraethylene glycol dimethacrylate, trimethylolpropane trimethacrylate or pentaerythritol tetramethacrylate; tetrahydrofuryl acrylate; and polyols having more than two hydroxy groups modified with acrylates. One or more monomers can be employed in the invention.

The amount of monomer used with the polyester acrylate in the intermediate layer of the invention is preferably 10 to 60 wt %, more preferably 15 to 50 wt %, based on the total amount of the monomer and the polyester acrylate; If the amount of the monomer is less than 10 wt %, better coating properties of the composition for the intermediate layer cannot be obtained. If the amount of the monomer is more than 60 wt %, better surface properties of the intermediate layer cannot be obtained because self-levelling of the composition for the intermediate layer is poor, and adhesion between the intermediat layer and the support cannot be further improved. Where the amount of the monomer is over 60 wt %, curling of the medium is often caused and the exposure amount of radiation has to be more for polymerization of the monomer.

In addition, thermoplastic resins such as vinyl chloride-vinylidene chloride resins, urethane resins, acrylonitrile-butadiene resins, vinyl chloride-vinyl acetate resins, cellulose resins or acetal resins can be used for the intermediate layer with polyester acrylates.

A solvent can be employed to coat the polyester acrylate for intermediate layer on a support. Where the monomer acts as a solvent and the molecular amount of the polyes.ter acrylate is low, no solvent need be employed because the composition has good coating properties and self-levelling properties without using an other solvent.

The radiation employed in this invention is electron beam or ultraviolet radiation. Where ultraviolet radiation is used, it is preferred that a sensitizing agent be added to the composition for the intermediate layer. The sensitizing agent is not limited, but a sensitizing agent having a relatively high extinction coefficient at the wave lengths of 254 nm, 313 nm and 365 nm, at which a bright line spectrum is generated by a mercury lamp conventionally used as a light source for ultraviolet radiation is preferred.

Typical examples of the sensitizing agents are aromatic ketones such as acetophenone, benzophenone, benzoin ethyl ether, benzyldimethyl ketal, benzyldiethyl ketal, benzoin isobutyl ketone, hydroxydimethylphenyl ketone, 1-hydroxycyclohexyl phenyl ketone, 2,2-diethyloxyacetophenone or Michler's ketone.

The amount of the sensitizing agent is 0.5 to 20 parts by weight, preferably 2 to 15 parts by weight, more preferably 3 to 10 parts by weight, based on 100 parts by weight of the intermediate layer (excluding the weight of solvent).

When the intermediate layer is coated on the support, various solvents can be used, and if the coating composition for the intermediate layer is a low viscosity liquid, e.g., when the polyester acrylate has a low molecular weight and the monomer used therewith acts as a solvent, no solvent need be present. As examples of solvents, there are ketones such as acetone, methyl ethyl ketone, methyl isobutyl ketone or cyclohexanone; alcohols such as methyl alcohol, ethyl alcohol, propyl alcohol or butyl alcohol; esters such as methyl acetate, ethyl acetate, butyl acetate, ethyl lactate or glycol acetate monoethyl ether; glycol ethers such as ether, glycol dimethyl ether, glycol monoethyl ether or dioxane; aromatic hydrocarbons such as benzene, toluene or xylene; chlorinated hydrocarbons such as methylene chloride, ethylene chloride, carbon tetrachloride, chloroform, ethylene chlorohydrin or dichlorobenzene, etc.

The thickness of the intermediate layer (which is measured after it is polymerized and hardened by radiation exposure) is 0.1 to 2 μm and preferably 0.1 to 1.5 μm. The surface roughness of the intermediate layer is preferably less than 0.01 μm. To obtain the intermediate layer, it is effective that the viscosity of the coating composition for the intermediate layer be kept low, preferably within the range of from 1 to 1000 cps and more preferably from 5 to 500 cps (at 25° C), that is, a levelling effect is attained by adding a low viscosity compound or an organic solvent to the composition.

Since the polyester acrylate employed in the intermediate layer of the invention has low viscosity; thin layer coating is possible and the surface roughness of the intermediate layer is smoothened by a levelling effect, whereby magnetic recording medium having good adhesion to the support and good durability is obtained.

As an electron beam accelerator used for polymerization, e.g., a scanning method, a double scanning method or a curtain beam method can be used. Particularly, the curtain beam method is preferred because it provides high power at low cost. The acceleration voltage of the accelerator is 10 to 1000 kV, preferably 50 to 300 kV, and the absorption amount of electron beams is generally 0.5 to 20 Mrad, preferably 1 to 10 Mrad. Where the acceleration voltage is less than 10 kV, the amount of energy is insufficient, and where it is more than 1000 kV, The efficiency of energy use for polymerization is reduced and is not ecconomical. Where the absorption amount is less than 0.5 Mrad, the hardening reaction insufficiently proceeds, and where it is more than 20 Mrad, the efficiency of energy use for hardening is reduced, and materials to be exposed generate heat and plastic supports are deformed.

The magnetic layer provided on the polymerization hardened layer of this invention is conventional and is composed of ferromagnetic particles and a binder as main components, or is composed of a ferromagnetic thin metal film.

A ferromagnetic thin metal film used in this invention is typically prepared by a forming the film in a vacuum chamber or plating a metal on a support. The use of the vacuum chamber is more preferred because the speed of forming the thin metal film is high, preparation steps are simple and no waste liquid is generated. The methods for forming the thin films include depositing a vapor of a substance or compound in a vacuum chamber or a dilute gas on a support, such as sputtering, ion plating or chemical gas plating.

The ferromagnetic metal for the magnetic thin film includes iron, cobalt, nickel or an alloy such as Fe-Co, Fe-Ni, Co Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co Ni-P, Co-Ni-B, Co-Ni-Ag, Co-Ni-Na, Co-Ni-Ce, Co-Ni-Zn, Co-Ni Cu, Co-Ni-W, Co-Ni-Re or Co-Sm-Cu.

The thickness of the magnetic thin film is generally 0.03 to 2 $\mu$m, preferably 0.07 to 0.4 $\mu$m.

The ferromagnetic powder, additives, organic solvents and methods for preparing magnetic recording media include a dispersing method and a coating method as disclosed in U.S. Pat. Nos. 4,135,016 and 4,205,353 and Japanese Patent Application (OPI) No. 46,011/79.

The present invention will now be explained in more detail by the following Examples. In the Examples, all part and ratio are by weight.

EXAMPLE 1

A polyester diacrylate having a molecular weight of (trade name "Aronix M 6100", acrylated polycondensates of dihydric alcohol and dibasic acid manuractured by Toa Gosei Chemical Industry Co., Ltd., viscosity 200–500 (at 25° C.) was coated on polyethylene terephthalate film having a thickness of 14.5 $\mu$m, and was exposed to electron beams at an absorption amount of 2 Mrad, an acceleration voltage of kV and a beam electric current of 5 mA to yield an intermediate layer.

The surface roughness of the support was 0.010 $\mu$m, and the thickness of the intermediate layer was 0.5 $\mu$m.

A magnetic coating composition having the following formula was kneaded and dispersed for 10 hours.

| | |
|---|---|
| Co-containing $\gamma$-Fe$_2$O$_3$ (Hc 630 Oe; particle size 0.4 $\mu$m $\times$ 0.05 $\mu$m $\times$ 0.05 $\mu$m) | 300 parts |
| Polyester polyurethane (ethylene adipate-2,4-tolylenediisocyanate reaction product; average molecular weight based on styrene about 130,000) | 35 parts |
| Vinyl chloride-vinyl acetate-maleic anhydride copolymer (content of maleic acid 3.0 wt %; polymerization degree about 400) | 30 parts |
| Dimethyl polysiloxane (polymerization degree about 60) | 2 parts |
| Butyl acetate | 300 parts |
| Methyl isobutyl ketone | 300 parts |

After dispersing the composition, 22 parts of a 75 wt % ethyl acetate solution of trimethylolpropane adduct of triisocynate compound (molecular weight: about 760, content of NCO: 13.3 wt %, trade name "Desmodule L-75" manufactured by Bayer A.G.) was added and dispersed for 1 hour by high speed shearing to provide a magnetic coating composition. The thus prepared coating composition was coated in a dry thickness of 4 $\mu$m on the intermediate layer. The magnetic layer was subjected to orientation under a direct current magnetic field, and was then dried with air at 100° C. After drying, the magnetic layer was calendered and slit to a 1/2 inch width to obtain Sample No. 1 for magnetic video tape.

COMPARATIVE EXAMPLE 1

The same procedure as in Example 1 was repeated except that the intermediate layer was not provided to obtain Sample No. 2 for magnetic tape.

EXAMPLE 2

The same procefure as in Example 1 was repeated except that the following coating composition was coated instead of "Aronix M 6100" and was exposed to a mercury lamp (80 watt/cm) for 1 second to obtain Sample No. 3 for magnetic tape.

| | |
|---|---|
| Polyester diacrylate (obtained by acrylating both ends of a polyester polyol of butanediol and adipic acid; molecular weight about 3000) | 95 parts |
| Benzophenone | 5 parts |

EXAMPLE 3

The same procedure as in Example 1 was repeated except that a polyethylene terephthalate film having a surface roughness of 0.015 $\mu$m was used as a support to obtain Sample No. 4 for magnetic tape.

COMPARATIVE EXAMPLE 2

The same procedure as in Comparative Example 1 was repeated except that a polyethylene terephthalate film having a surface roughness of 0.015 $\mu$m was used as a support to obtain Sample No. 5 for magnetic tape.

EXAMPLE 4

The same procedure as in Example 1 was repeated except that a polyethylene terephthalate film having a surface roughness of 0.020 μm was used to obtain Sample No. 6 for magnetic tape.

COMPARATIVE EXAMPLE 3

The same procedure as in Comparative Example 1 was repeated except that a polyethylene terephthalate film having a surface roughness of 0.020 μm was used to obtain Sample No. 7 for magnetic tape.

EXAMPLE 5

The same procedure as in Example 1 was repeated except that a magnetic thin film of Co-Ni (Ni; 20 wt %) was provided on the intermediate layer at a thickness of 1000° A by oblique vapor deposition instead of the earlier described magnetic coating layer to obtain Sample No. 8 for magnetic tape.

COMPARATIVE EXAMPLE 4

The same procedure as in Example 5 was repeated except that the intermediate layer was not coated to obtain Sample No. 9 for magnetic tape.

EXAMPLE 6

The same procedure as in Example 1 was repeated except that a different polyester diacrylate (i.e. the diacrylate compound of polyesterdiol formed of ethylene glycol and adipic acid; molecular weight about 500) was coated instead of "Aronix M 6100" on a polyethylene terephthalate film having a surface roughness of 0.015 μm and a thickness of 15 μm, to obtain Sample No. 10 for magnetic tape.

COMPARATIVE EXAMPLE 5

The same procedure as in Example 1 was repeated except that a polyester monoacrylate (i.e., monoacrylate compound of polyesterdiol formed of ethylene glycol and adipic acid; molecular weight about 500) was coated instead of "Aronix M 6100" on a polyethylene terephthalate film having a surface roughness of 0.015 μm and a thickness of 15 μm, to obtain Sample No. 11 for magnetic tape.

The video sensitivity, C/N and adhesiveness of these Samples were measured by the following methods.

Video sensitivity: The reproduced output at 4 MHz was measured by means of VHS type VTR (trade name "NV-8800" manufactured by Matsushita Electric Industries Co., Ltd) and was shown by the relative value to the output of Sample No. 2 in Comparative Example 1.

C/N: A carrier was recorded at 3 MHz and 3.5 MHz on the Samples and reproduced. The ratio of the reproduced carrier to noise (corresponding to the S/N ratio) was measured and was shown by the relative value(-ratio) to that of Sample No. 2 in Comparative Example 1.

Adhesiveness: An adhesive tape made of polyethylene terephthalate and adhered to a magnetic layer of the Samples (½ width) was stripped from the magnetic layer at an angle of 180°. The force to strip was measured by a spring scale.

The results are shown in Table 1. As is apparent from Table 1, a magnetic recording medium having a markedly improved video sensitivity and C/N ratio can be obtained by providing an intermediate layer containing a polyester acrylate between a support having a surface roughness of not less than 0.01 μm and a magnetic layer.

TABLE 1

| Sample No. | Example or Comparative Example | Surface roughness of Support (μm) | Feature of Samples | Surface roughness of intermediate layer (μm) | Video sensitivity (dB) | C/N (dB) 3 MHz | C/N (dB) 3.5 MHz | Adhesiveness (g) |
|---|---|---|---|---|---|---|---|---|
| 1 | Ex. 1 | 0.010 | Aronix M 6100 (M.W. about 1000) | 0.005 | +1.1 | +0.6 | +2.0 | 120 |
| 2 | Com. Ex. 1 | " | — | — | ±0 | ±0 | ±0 | 5 |
| 3 | Ex. 2 | " | Polyester diacrylate (M.W. about 3000) | 0.004 | +1.0 | +0.5 | +1.9 | 110 |
| 4 | Ex. 3 | 0.015 | Aronix M 6100 | 0.008 | +0.5 | +0.3 | +1.0 | 120 |
| 5 | Com. Ex. 2 | " | — | — | −1.0 | −0.7 | −1.2 | 5 |
| 6 | Ex. 4 | 0.020 | Aronix M M 6100 | 0.005 | +1.0 | +0.5 | +1.9 | 120 |
| 7 | Com. Ex. 3 | " | — | — | −2.0 | −1.2 | −1.8 | 5 |
| 8 | Ex. 5 | 0.010 | Aronix M 6100 (Co—Ni thin film) | 0.004 | +3.4 | +1.4 | +3.5 | 110 |
| 9 | Com. Ex. 4 | " | — (Co—Ni thin film) | — | +2.4 | +0.9 | +2.2 | 6 |
| 10 | Ex. 6 | 0.015 | Polyester diacrylate (M.W. about 500) | 0.003 | +1.3 | +0.7 | +2.2 | 130 |
| 11 | Com. Ex. 5 | " | Polyester monoacrylate (M.W. about 500) | 0.004 | +1.0 | +0.5 | +1.5 | 18 |

EXAMPLE 7

Polyester acrylate which was formed by acrylating both end groups of a polyester polyol consisting of butanediol and adipic acid, and having a molecular weight of 3000, and trimethylolpropane triacrylate were mixed in a weight ratio of 40:60. The thus prepared solution was coated on a polyethylene terephthalate film having a surface roughness of 0.020 μm and a thickness of 14.5 μm, was then exposed to electron beams in an absorption amount of 3 Mrad at an acceleration voltage of 165 kV and a beam electric current of 5 mA. The thickness of intermediate later after hardening was 0.6 μm.

A magnetic coating composition having the following formula was kneaded and dispersed for 10 hours.

| | |
|---|---|
| Co-containing γ-$Fe_2O_3$ (Hc 630 Oe; particle size 0.4 μm × 0.05 μm × 0.05 μm) | 300 parts |
| Polyester polyurethane (ethylene adipate-2,4-tolylenediisocyanate reaction product; average molecular weight based on styrene about 130,000) | 35 parts |
| Vinyl chloride-vinyl acetate-maleic anhydride copolymer (content of maleic acid 3.0 wt %; polymerization degree about 400) | 30 parts |
| Dimethyl polysiloxane (polymerization degree about 60) | 2 parts |
| Butyl acetate | 300 parts |
| Methyl isobutyl ketone | 300 parts |

After dispersing the composition, 22 parts of a 75 wt % ethyl acetate solution of a trimethylolpropane adduct of a triisocyanate compound (molecular weight, about 760, content of NCO: 13.3 wt %, trade name "Dismodule L-75" manufactured by Bayer A.G.) was added and dispersed for 1 hour by high speed shearing to provide a magnitic coating composition. The thus prepared coating composition was coated in a dry thickness of 4 μm on the intermediate layer. The magnetic layer was subjected to an orientation treatment under a direct current magnetic field, and then was dried with are at 100° C. After drying, the magnetic layer was calendered and slit to a ½ inch width to obtain Sample No. 12 for magnetic video tape.

COMPARATIVE EXAMPLE 6

The same procedure as in Example 7 was repeated except that an intermediate layer was not coated to obtain Sample No. 13.

EXAMPLE 8

On a polyethylene terephthalate film having a coating composition containing 47.5 parts of polyester acrylate having a molecular weight of 2000 which was formed by acrylating a polyester polyol of trimethylol propane, butanediol and adipic acid (ratio of trimethylol propane to butanediol; 1:4), 47.5 parts of tetraethylene glycol diacrylate and 5 parts of benzophenone was coated and exposed to ultra-violet radiation for 1 second using 80 Watt/cm mercury lamp. The thickness of the intermediate layer after polymerization-hardening was 1.0 μm.

Other procedures were the same as in Example 7, whereby Sample No. 14 was obtained.

EXAMPLE 9

The same procedure as in Example 7 was repeated except that a coating composition containing a polyester acrylate having a molecular weight of 800 and tetraethylene glycol diacrylate in a mixing weight ratio of 90:10 was used to obtain Sample No. 15. This polyester acrylate was prepared by acrylating polyester polyol formed of triethylene glycol and sebacic acid.

EXAMPLE 10

On the same support as in Example 7, a coating composition containing a polyester acrylate having a molecular weight of 600 and triethylene glycol diacrylarte in a ratio of 70:30 was coated and exposed to electron beam radiation as in Example 7 to obtain an intermediate layer having a thickness of 0.6 μm. This polyester acrylate was prepared by acrylating both end groups of a polyester polyol formed of butanediol and succinic acid.

A magnetic coating composition having the following composition was neaded and dispersed in a ball mill for 10 hours.

| | |
|---|---|
| Co-containing γ-$Fe_2O_3$ (Hc 630 Oe: particle size 0.4 μm × 0.05 μm × 0.05 μm) | 300 parts |
| Polyurethane acrylate (β-hydroxyethylacrylate-modified reaction product of ethylene adipate-2,4-tolylene diisocyanate; molecular weight 50,000) | 65 parts |
| Dimethyl polysiloxane (polymerization degree about 60) | 2 parts |
| Butyl acetate | 300 parts |
| Methyl isobutyl ketone | 300 parts |

After dispersing, 22 parts of trimethylolpropane triacrylate were added to the composition to prepare a magnetic composition in the same manner as in Example 7. The thus prepared magnetic coating composition was coated on the intermediate layer, followed by orientating, drying and calendering. Further, the magnetic layer was exposed to electron beams in an absorption amount of 10 Mrad at an accelleration voltage of 165 kV, and then was slit into 2 inch width to obtain Sample No. 16.

COMPARATIVE EXAMPLE 10

The same procedure as in Example 10 was repeated except that an intermediate layer was not coated, to obtain Sample 17.

EXAMPLE 11

A polyester acrylate having a molecular weight of 4000, which was formed by acrylating both end groups of a polyester polyol consisting of pentanediol and maleic acid, and trimethylolpropane triacrylate were mixed in a ratio of 50:50. The thus prepared composition was coated on polyethylene terephthalate film having a surface roughness of 0.010 μm and a thickness of 14.5 μm, and then was exposed to electron beams to provide an intermediate layer having a thickness of 0.5 μm.

On the intermediate layer, a Co-Ni thin film (Ni : 20 wt %) was provided at a thickness of 1000 Å by oblique vapor deposition method to obtain Sample No. 18.

COMPARATIVE EXAMPLE 8

The same procedure as in Example 11 was repeated except that an intermediate layer was not coated to obtain Sample No. 19.

COMPARATIVE EXAMPLE 9

The same procefure as in Example 7 was repeated except that while trimethylolpropane triacrylate was used but the polyester acrylate was not used, to provide an intermediate layer having a thickness of 0.7 μm, on which the same magnetic layer as in Example 7 was provided to obtain Sample No. 20.

Video sensitivity, C/N and adhesiveness of these Samples were measured in the same manner as described above. The results are shown in Table 2. The values with respect to the video sensitivity and C/N are the relative values to those of Sample No. 13 in Comparative Example 6.

TABLE 2

| Sample No. | Example or Comparative Example | Thickness of intermediate layer (μm) | Surface roughness of intermediate layer (μm) | Video sensitivity (dB) | C/N(dB)** (3.5 MHz) | Adhesiveness (g) |
|---|---|---|---|---|---|---|
| 12 | Ex. 7 | 0.6 | 0.008 | +3.1 | +1.0 | 140 |
| 13 | Com. Ex. 6 | 0 | — | ±0 | ±0 | 5 |
| 14 | Ex. 8 | 1.0 | 0.006 | +3.2 | +1.1 | 130 |
| 15 | Ex. 9 | 0.7 | 0.005 | ±2.5 | +1.0 | 140 |
| 16 | Ex. 10 | 0.6 | 0.007 | +2.0 | +0.8 | 150 |
| 17 | Com. Ex. 7 | 0 | — | ±0 | ±0 | 8 |
| 18 | Ex. 11 | 0.5 | 0.005 | +2.0 | +0.8 | 140 |
| 19 | Com. Ex. 8 | 0 | — | ±0 | ±0 | 9 |
| 20* | Com. Ex. 9 | 0.7 | 0.008 | +2.1 | +0.7 | 12 |

Note:
*Sample 20 caused curling.
**The C/N ratio was measured with respect to the carrier of 3.5 MHz.

As is apparent from Table 2, a magnetic recording medium having markedly improved video sensitivity, C/N ratio and adhesiveness can be obtained by providing an intermediate layer containing polyester acrylate and a monomer between a support having a surface roughness of not less than 0.01 μm and a magnetic layer.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having a surface roughness of not less than 0.01 μm and a magnetic layer, and an intermediate layer between the support and the magnetic layer which comprises a polyester polyol having at least two acryloyl and/or methacryloyl groups in-the molecule thereof which has been polymerization-hardened by exposure to radiation, wherein the surface roughness of the intermediate layer is less and 0.01 μm and wherein the polyester polyol has a molecular weight of 500 to 5,000.

2. The magnetic recording medium as claimed in claim 1, wherein the surface roughness of the support is from 0.015 to 0.5 μm.

3. The magnetic recording medium as claimed in claim 1, wherein the radiation is electron beam or ultraviolet radiation.

4. The magnetic recording medium as claimed in claim 1, wherein said polyester polyol is a polyester diacrylate.

5. The magnetic recording medium as claimed in claim 1, wherein the thickness of the intermediate layer is 0.1 to 2 μm.

6. The magnetic recording medium as claimed in claim: 5, wherein the thickness of the intermediate layer is 0.1 to 1.5 μm.

7. The magnetic recording medium as claimed in claim 1, wherein the radiation is electron beam irradiation, the thickness of the intermediate layer is 0.1 to 2μ, and the magnetic layer comprises ferromagnetic particles and a binder.

8. The magnetic recording medium as claimed in claim 1, wherein the intermediate layer further comprises a monomer polymerizable by radiation exposure which has a molecular weight of less than 500.

9. The magnetic recording medium as claimed in claim 8, wherein the monomer has a molecular weight of less than 300.

10. The magnetic recording medium as claimed in claim 8, wherein the amount of the monomer is 10 to 60 wt % based on the total amount of the monomer and the polyester polyol.

11. The magnetic recording medium as claimed in claim 10, wherein the amount of the mcnomer is 15 to 50 wt % based on the total amount of the monomer and the polyester polyol.

12. The magnetic recording medium as claimed in claim 1, wherein the magnetic layer comprises ferromagnetic particles and a binder.

13. The magnetic recording medium as claimed in claim 1, wherein the magnetic layer is a ferromagnetic thin metal film.

14. The magnetic recording medium as claimed in claim 1, wherein a back coating layer is provided on the surface of the support opposite the surface which carries the magnetic layer where the surface roughness of the back coating layer is not less than 0.01 μm.

15. The magnetic recording medium as claimed in claim 1, wherein a back coating layer is provided on the surface of the support opposite the surface which carries the magnetic layer where the surface roughness of the back coating layer is not less than 0.015 μm.

16. The magnetic recording medium as claimed in claim 7, wherein the polyester polyol is a polyester diacrylate.

* * * * *